(12) United States Patent
Holscher

(10) Patent No.: US 8,142,123 B2
(45) Date of Patent: Mar. 27, 2012

(54) NUT-TYPE ELEMENT TO BE FIXED IN AN INTERIOR OF A PROFILED WORKPIECE OR SIMILAR

(76) Inventor: Winfried K. W. Holscher, Engen (DE)

( * ) Notice: Subject to any disclaimer, the term of this patent is extended or adjusted under 35 U.S.C. 154(b) by 288 days.

(21) Appl. No.: 11/993,461

(22) PCT Filed: Jun. 29, 2006

(86) PCT No.: PCT/EP2006/006334
§ 371 (c)(1),
(2), (4) Date: Dec. 21, 2007

(87) PCT Pub. No.: WO2007/003347
PCT Pub. Date: Jan. 11, 2007

(65) Prior Publication Data
US 2010/0014937 A1    Jan. 21, 2010

(30) Foreign Application Priority Data
Jun. 30, 2005    (DE) ............... 20 2005 010 434 U

(51) Int. Cl.
  *F16B 27/00* (2006.01)
(52) U.S. Cl. ........................ 411/84; 411/104
(58) Field of Classification Search ............. 411/84, 411/85, 104; 248/49
  See application file for complete search history.

(56) References Cited

U.S. PATENT DOCUMENTS

| | | | |
|---|---|---|---|
| 1,872,385 A * | 8/1932 | Andren | 411/180 |
| 3,493,025 A | 2/1970 | La Londe et al. | |
| 4,460,299 A * | 7/1984 | Kowalski | 411/85 |
| 4,645,393 A * | 2/1987 | Pletcher | 411/84 |
| 4,768,907 A * | 9/1988 | Gauron | 411/85 |
| 5,032,047 A * | 7/1991 | Theakston | 411/104 |
| 6,086,300 A * | 7/2000 | Frohlich | 411/84 |
| 6,109,849 A | 8/2000 | Nagayama | |
| 6,582,170 B2 * | 6/2003 | Dinh et al. | 411/85 |
| 2003/0190214 A1 * | 10/2003 | Babej et al. | 411/180 |

FOREIGN PATENT DOCUMENTS
DE    92 15 843.9    3/1993
* cited by examiner

*Primary Examiner* — Gary Estremsky
(74) *Attorney, Agent, or Firm* — Bachman & LaPointe, P.C.

(57) ABSTRACT

A nut-type element (30) which is to be fixed in an interior (16) of a profiled workpiece (10) or similar and is provided with a longitudinal extension (a) that exceeds the width (n) of an insertion cross-section (14), particularly a joining device for connecting a first workpiece encompassing the interior to another workpiece by a screw or similar member whose shaft penetrates a hole of the workpiece and can be inserted into a recess of the metallic nut-type element located in the interior of the workpiece. The nut-type element (30) is embodied as a rectangularly expanded member which is penetrated approximately in the center by a threaded bore (42) in the direction of the longitudinal axis (Q). The threaded bore (42) extends into an annular molded edge (44) on the surface (40) of the element. The annular molded edge (44) protrudes from the surface. At least one molded-on piece (52) that protrudes from the surface and forms an engagement gap (58) along with the molded edge is allocated to the annular molded edge (44) at a specific radial distance (f).

24 Claims, 2 Drawing Sheets

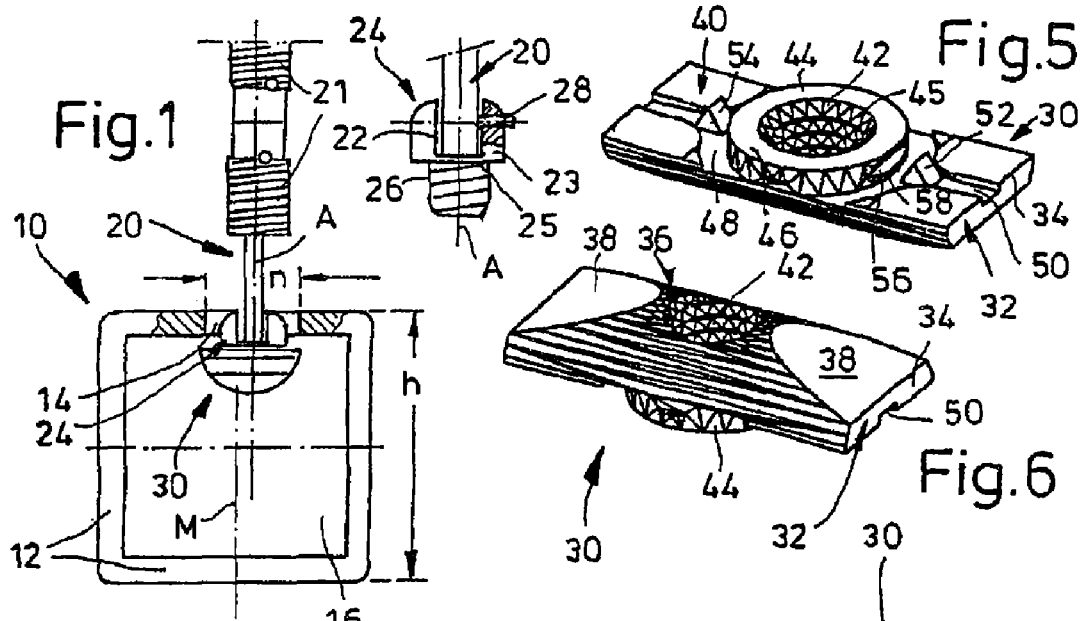
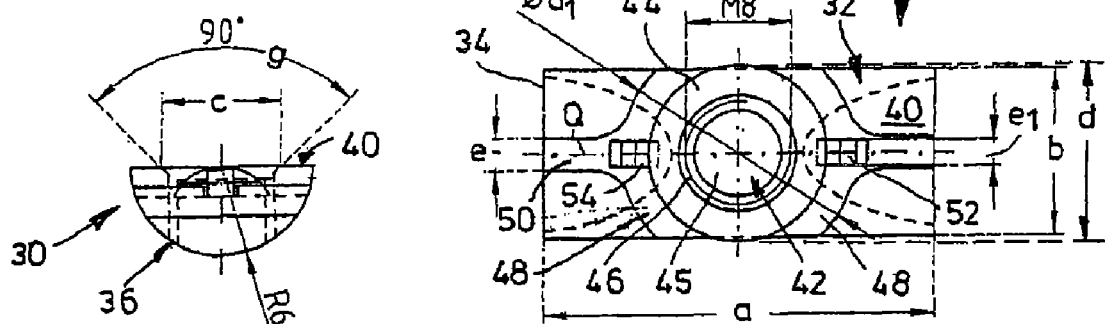
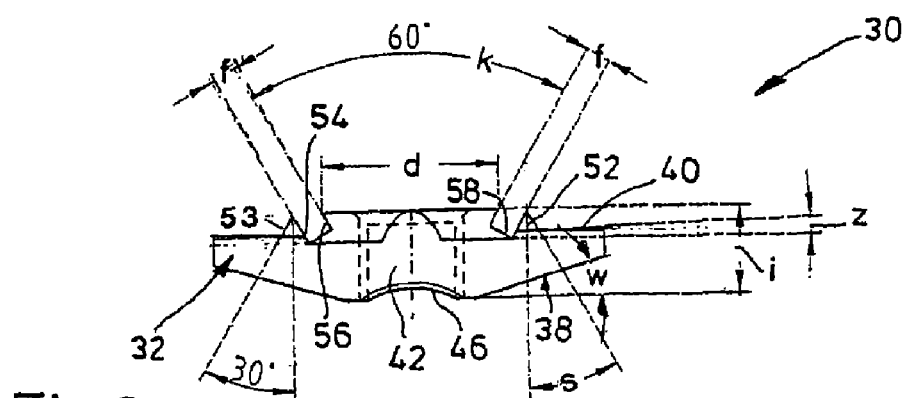

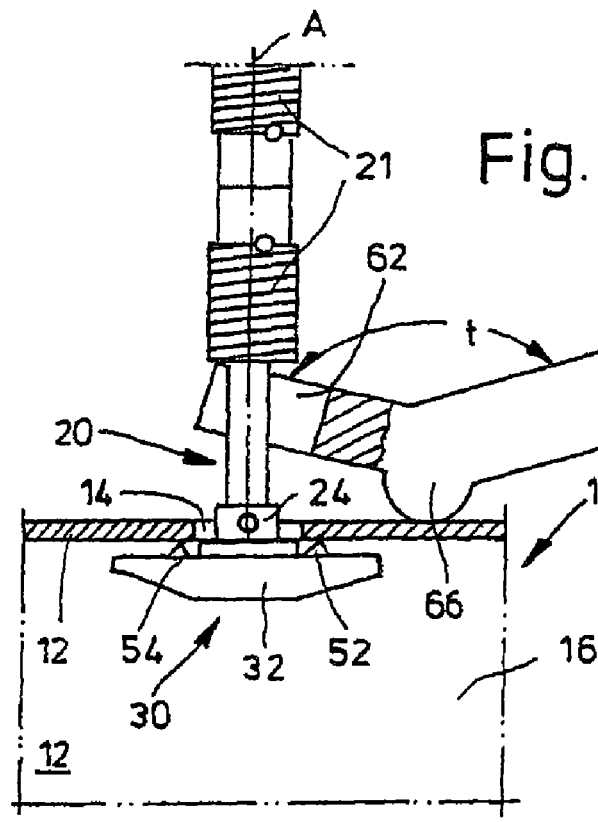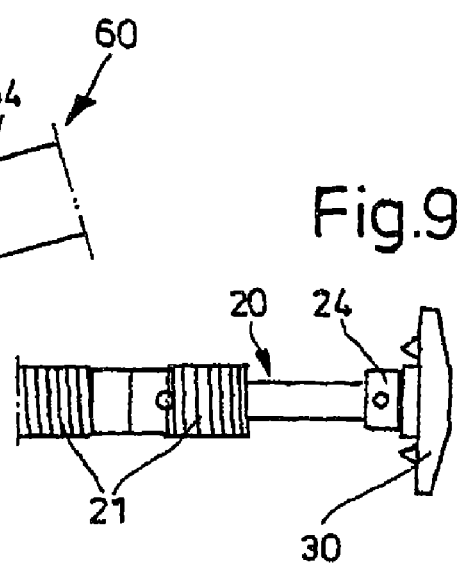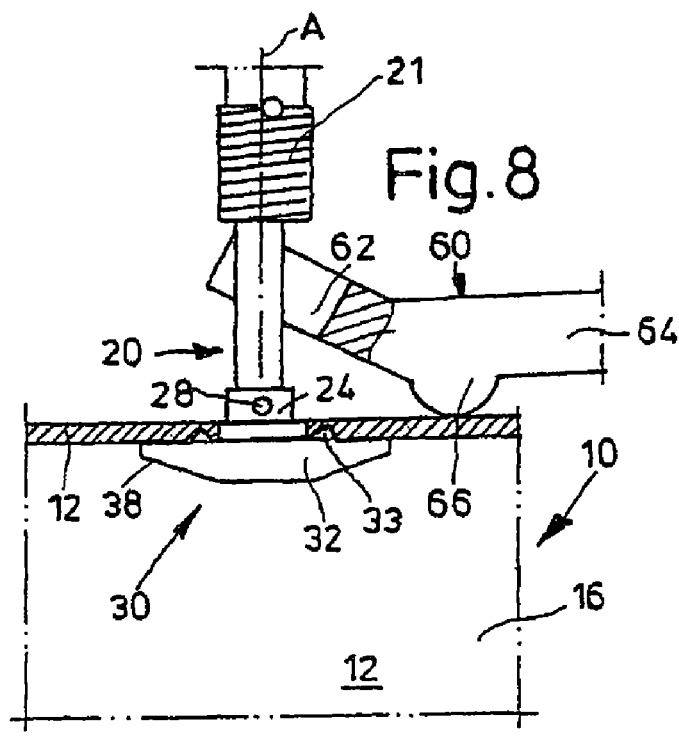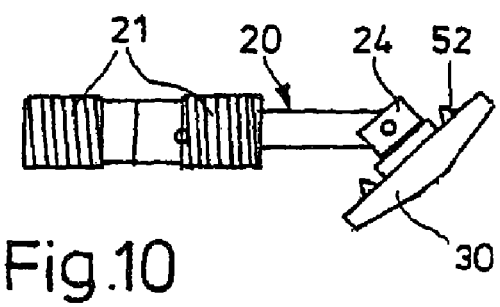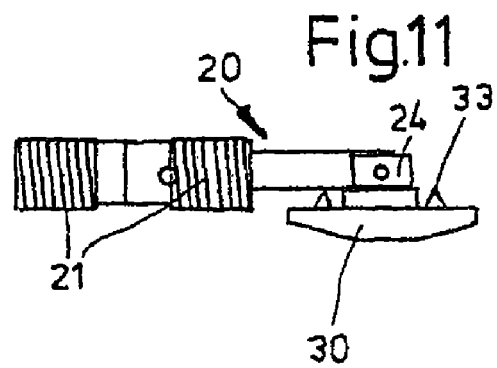

NUT-TYPE ELEMENT TO BE FIXED IN AN INTERIOR OF A PROFILED WORKPIECE OR SIMILAR

BACKGROUND OF THE INVENTION

The invention relates to a nut-like element for fixing in an interior space of a profile or suchlike workpiece, having a longitudinal extent exceeding the width of an insertion cross section, in particular a connecting device for connecting a first workpiece having the interior space to another workpiece by means of a screw or suchlike member, the shank of which passes through an opening of the workpiece and can be inserted into a recess of the nut-like element, which is located in the interior space of the workpiece and is made of a metallic material.

In particular in the case of metallic hollow bodies whose interior space is not accessible from outside, the fastening of a profile or the like by a screw still involves difficulties.

It is certainly known to fix pictures, shelves or the like to hollow walls of buildings using screws by inserting a plastic plug into the cavity behind a hole, said plastic plug then being deformed by an inserted hook, a screw or the like and being brought to bear as an abutment against the inner surface of the wall. However, it is not advantageous to use such plastic plugs when in particular metallic profiles of the type described are to be connected to one another.

Publication DE-GM 92 15 843 of the applicant, for example, discloses an element of the type described at the beginning. This sliding block is of roughly parallelepiped design and has at least two flank walls, located opposite one another and inclined at an angle, and a spring member which is fixed at one end on one of the flank walls and reaches across the narrower surface of the element with its free end; the latter is arranged at a distance from a surface of the sliding block in the relaxed state of the spring member.

In the knowledge of this prior art, the aim of the invention is to provide nut-like elements of the type mentioned at the beginning which firstly largely simplify the insertion into a hollow body and secondly can be produced in a favorable manner.

SUMMARY OF THE INVENTION

According to the invention, the nut-like element, preferably produced as a precision casting, is designed as a body which is extended in a rectangular manner and through which a tapped hole passes approximately centrally in the longitudinal axis, said tapped hole opening at a surface of the element into an annular shaped rim; the latter projects above said surface, and at least one integrally formed portion rising from the surface is also assigned to it at a radial distance, said integrally formed portion forming together with the shaped rim an engagement gap; the integrally formed portions serve as notching tools when they are pressed into a surface, surrounding an aperture as insertion cross section, of the element or profile.

According to a further feature of the invention, the annular shaped rim extends at least over the width of the element; the outside diameter of the shaped rim can advantageously even be slightly larger than the width of the element, and this shaped rim can project beyond the lateral longitudinal edges of the element. It has also proved to be favorable for the manipulation for an annular rim formed by the shaped rim to be chamfered at its annular edge pointing toward the tapped hole, preferably at a chamfer angle of about 90°.

According to the invention, two curved grooves integrally formed in the surface and in the shape of a circle segment are assigned to the annular shaped rim. In addition, two shaped channels parallel to the longitudinal axis of the element are integrally formed in its surface, and in each case one of the integrally formed portions referred to is provided at the respective transition of said shaped channels to the curved groove; both engagement gaps are arranged in alignment with one another at the longitudinal axis.

Each of the integrally formed portions is to offer at least one sloping surface, and the sloping surfaces of both integrally formed portions are inclined toward the shaped rim and downward relative to one another. These two sloping surfaces can define between them an angle of about 60° at the engagement gaps.

A notch, as opposite surface, is advantageously located at the shaped rim opposite the sloping surface of the integrally formed portion, the surface of said notch running parallel to the sloping surface and said notch likewise defining said engagement gap; the distance between sloping surface and notch is to be about 2 mm.

The integrally formed portion is to be triangular in axial section, since a rear surface inclined in the opposite direction is located opposite the sloping surface as a limit on the other side of the integrally formed portion; both form a knife-edge-like ridge of the integrally formed portion. Both integrally formed portions can be designed such that they can be pressed as notching tools into a profile surface surrounding an aperture serving as insertion cross section of a wall of the element.

In addition, the rear side of the element is to be formed in cross section in the shape of a circle segment and has two sloping surfaces which are inclined with respect to transverse edges of the element, but are flat per se, and which preferably run at an angle of about 25° to the surface of the element. Apart from that, the latter surface can also be inclined upward at a narrow angle on each side of the curved grooves toward the transverse edges of the element.

To manipulate the element according to the invention, a retaining rod or suchlike tool is used which has a threaded stem for the tapped hole of the element. This threaded stem is to be part of a rod joint of the retaining rod and is to be connected to the latter by a joint pin. A cantilever member projecting from the retaining rod, in particular a threaded sleeve coaxial to the retaining rod, is preferably attached at a distance from the rod joint, and a pulling tool can be placed against said cantilever member; the element according to the invention is brought up to an inner surface of the profile by pressing on this cantilever member.

The pulling tool advantageously has a fork-shaped actuating end, which can be placed against said cantilever member on both sides of the retaining rod. A handle section is integrally formed in an angled manner on said pulling tool, wherein, at the transition from the handle section to the actuating end, a seating bead projects transversely to the longitudinal axis of the handle section on that side of the pulling tool which is remote from the angle between said handle section and said actuating end, said seating bead being placed on the outside of the profile wall. Pressure on the handle section produces a pressure on said cantilever member, and this leads to the actuation of the retaining rod.

On the whole, a system is obtained which, in an attractive manner, achieves the object envisaged by the inventor.

BRIEF DESCRIPTION OF THE DRAWINGS

Further advantages, features and details of the invention follow from the description below of preferred exemplary embodiments and with reference to the drawing, in which:

FIG. 1 shows a partly sectioned front view of a hollow profile with a push-through nut arranged in said hollow profile and with a laterally accentuated, additionally somewhat enlarged fitting element with associated retaining rod;

FIG. 2 shows a front view of the push-through nut enlarged relative to FIG. 1;

FIG. 3 shows the push-through nut of FIG. 2 in a side view;

FIG. 4 shows the push-through nut of FIG. 2 in plan view;

FIG. 5 shows an oblique view of the top side of the push-through nut;

FIG. 6 shows an oblique view of the underside of the push-through nut;

FIGS. 7, 8 show two sectioned side views for different operating positions of a retaining rod with attached push-through nut;

FIGS. 9 to 11 each show a side view of the retaining rod with push-through nut in different positions.

DETAILED DESCRIPTION

An extruded hollow profile 10, which in this case is of rectangular cross section having an external lateral height h of, for example, 40 mm, is provided in the region of its walls 12 with an aperture of a diameter n of, in this case, 14 mm. Its center axis A in this case runs at a slight lateral distance from the center line M of the hollow profile cross section.

A "push-through nut" 30 can be seen in the interior space 16 of the hollow profile 10, said push-through nut 30 being releasably fixed to a retaining rod 20. The latter is of rectangular cross section and rests with its free rod end, close to the profile, in a channel space 22 of a rod joint 24, from whose base surface 25 remote from the channel space 22 an axial threaded stem 26 projects. This rod joint 24 is connected to the retaining rod 20 by a joint pin 28 passing through the flank walls 23 of the channel space 22. At the other end, the retaining rod 20 rests in axially arranged threaded sleeves 21 forming a cantilever member.

The push-through nut 30 has a plate-like nut body 32 which is rectangular in plan view and has a length a of, in this case, 30 mm and a width b of about 13 mm and whose rear side or underside 36, illustrated in FIG. 6, has a cross section essentially in the shape of a circle segment and contains two angular surfaces 38 which, with respect to its transverse edges 34, are inclined at an angle w of about 25° to the surface 40 of the push-through nut 30 and are flat per se.

The two tongue-like angular surfaces 38 end close to a central tapped hole indicated at 42, which ends at said surface 40 in an annular shaped rim 44, which projects above the surface 40 and in which the hole orifice 45 is enclosed by an annular rim 46 which is chamfered relative to it at a chamfer angle g of, in this case, 90° and has an outside diameter c of 9 mm. This shaped rim 44 of outside diameter d of somewhat more than 13 mm projects slightly laterally beyond the plate-shaped nut body 32 and is enclosed by a curved groove 48 which is partly integrally formed in the surface 40, is in the shape of a circle segment and has an outside diameter $d_1$ of, in this case, 18 mm. Two shaped channels 50 of the surface 40 running with one another in the longitudinal axis Q of the push-through nut 30 and having a width e of 2.5 mm open into said curved groove 48.

It can be seen from FIGS. 3 to 5 that an integrally formed portion 52 of width $e_1$ of 2 mm rises at the transition from said curved groove 48 to the shaped channel 50 at a distance f of about 2 mm from the shaped rim 44, and that surface of said integrally formed portion 52 which points toward said shaped rim 44 is inclined downward toward the latter as a sloping surface. The rear surface 53 of the integrally formed portion 52 is also inclined outward toward the surface 40 at an angle s of, in this case, 30° to the center line of the integrally formed portion; said center line is determined by a knife-edge-like ridge 33 of the integrally formed portion 52, said ridge 33 being defined by the sloping and rear surfaces 54, 53 coming together there.

The angle k determined by the two front sloping surfaces 54 of the integrally formed portions 52 measures 60° here. Located opposite the sloping surface 54 in the outer surface of the shaped rim 44 at a distance f of about 2 mm is a notch 56 inclined in parallel, as indicated in particular by FIG. 3. This distance f determines the width of a gap 58 as engagement width for notching the integrally formed portions 52. During the notching of the integrally formed portions 52, the surrounding material is pressed right up to the inclined opposite surface 56.

Apart from that, FIG. 3 also illustrates an angle z of 2° between the bottom of the shaped channel 50 and the surface 40, rising in a slightly inclined manner from the curved groove 48, of the push-through nut 30 and also illustrates the overall height i of the latter.

The push-through nut 30 is screwed onto the threaded stem 26 on the retaining rod (FIG. 9), is swung up to one of the outer surfaces of the latter (FIGS. 10, 11) and is then inserted through the aperture or the hole 14 of the hollow profile wall 12 into the profile interior space 16 and is also set back in the latter again into the initial position illustrated in FIG. 9.

As can be seen from FIGS. 7, 8, a pulling tool 60 having a fork-shaped actuating end 62 is brought up to the retaining rod 20. The two prongs of the actuating end 62 are bent at an angle t of, in this case, 30° to a handle section 64 of the tool 60; provided in the bend region on the outside is a knee-like seating bead 66, which helps to simplify the lifting of the retaining rod 20 located at the actuating end 62. When the handle section 64 is lowered, the push-through nut 30 is pulled against the adjacent inner surface of the hollow profile 10. In the process, the integrally formed portions 52 press the surrounding material into the gap 58 right up to the inclined surface 56; the integrally formed portions 52 then rest in the hollow profile wall 12 in a positive-locking manner, as can clearly be seen from FIG. 8. The retaining rod 20 is unscrewed, and a frictional connection can be produced using a screw or suchlike additional part. The push-through nut 30 now lies calked in the interior space of the hollow profile 10 and is secured against falling out or against rotation.

The invention claimed is:

1. A nut element for fixing in an interior space of a profile, the nut element for connecting a first workpiece having the interior space to another workpiece by means of a screw or other threaded member, the shank of which passes through an opening of the workpiece and can be inserted into a recess of the nut element, which is adapted to be located in the interior space of the workpiece and is made of a metallic material, characterized in that the nut-like element is designed as a body which is extended in a rectangular manner and through which a tapped hole passes approximately centrally in the longitudinal axis (Q), said tapped hole opening at a surface of the element into an annular shaped rim which projects above said surface and to which at least one integrally formed portion rising from the surface is assigned at a radial distance (f), said integrally formed portion forming together with the shaped rim an engagement gap, two shaped channels parallel to the longitudinal axis (Q) are integrally formed in its surface, and in each case an integrally formed portion is provided with sloping surfaces at the respective transition of said shaped channels to the curved groove (48), both engagement gaps being arranged in alignment at the longitudinal axis, the sloping surfaces of both integrally formed portions are inclined toward the shaped rim and downward relative to one another, wherein a notch, as opposite surface, is located at the shaped rim opposite the sloping surface of the integrally formed portion.

2. The element as claimed in claim 1, wherein it is produced as a precision casting.

3. The element as claimed in claim 1, wherein the annular shaped rim extends at least over the width (b) of the nut element.

4. The element as claimed in claim 3, wherein the outside diameter (d) of the shaped rim is slightly larger than the width (b) of the element, and the shaped rim projects beyond the lateral longitudinal edges of the nut element.

5. The element as claimed in claim 1, wherein an annular rim formed by the shaped rim is chamfered at opposite sides of its annular edge pointing toward the tapped hole at a chamfer angle (g) of about 90°.

6. The element as claimed in claim 1, wherein two curved grooves in the shape of a circle segment are assigned to the annular shaped rim and are integrally formed in the surface.

7. The element as claimed in claim 1, wherein the two sloping surfaces define between them an angle (k) of about 60° at the engagement gaps.

8. The element as claimed in claim 1, wherein the surface of said notch runs parallel to the sloping surface.

9. The element as claimed in claim 8, wherein a distance (f) of about 2 mm between sloping surface and notch.

10. The element as claimed in claim 1, wherein the integrally formed portion has, on the one hand, the inner sloping surface defining the engagement gap and, on the other hand, a sloping surface running in the opposite direction thereto as rear surface.

11. The element as claimed in claim 10, wherein a knife-edge-like ridge as boundary line between sloping surface and rear surface of the integrally formed portion.

12. The element as claimed in claim 1, wherein its two integrally formed portions are designed such that they can be pressed as notching tools into a profile surface surrounding an aperture.

13. The element as claimed in claim 12, wherein a rear side is formed in cross section in the shape of a circle segment and has two angular surfaces which are inclined with respect to transverse edges of the element and are flat.

14. The element as claimed in claim 13, wherein an angle (w) of about 25° between the angular surface and the surface of the element.

15. The element as claimed in claim 14, wherein that its surface is inclined upward at a narrow angle (z) on each side of the curved grooves toward transverse edges.

16. The element as claimed in claim 1, wherein a threaded stem of a retaining rod is assigned to the tapped hole.

17. The element as claimed in claim 16, wherein the threaded stem is part of a rod joint of the retaining rod and is connected to the latter by a joint pin.

18. The element as claimed in claim 17, wherein a cantilever member projecting from the retaining rod, in particular a threaded sleeve coaxial to the retaining rod, is arranged at a distance from the rod joint, and a pulling tool can be attached to said cantilever member/threaded sleeve.

19. The element as claimed in claim 18, wherein an actuating end, which can be placed against the cantilever member of the pulling tool, has a handle section running at an angle (t) to the actuating end.

20. The element as claimed in claim 19, wherein, at the transition from the handle section to the actuating end, a seating bead projects transversely to the longitudinal axis of the handle section on that side of the pulling tool which is remote from the angle (t).

21. The element as claimed in claim 20, wherein the actuating end is designed in a fork shape with two approximately parallel prongs.

22. A nut element for fixing in an interior space of a profile, the nut element for connecting a first workpiece having the interior space to another workpiece by means of a screw or other threaded member, the shank of which passes through an opening of the workpiece and can be inserted into a recess of the nut element, which is adapted to be located in the interior space of the workpiece and is made of a metallic material, characterized in that the nut element is designed as a body which is extended in a rectangular manner and through which a tapped hole passes approximately centrally in the longitudinal axis (Q), said tapped hole opening at a surface of the element into an annular shaped rim which projects above said surface and to which two integrally formed portions rising from the surface are assigned at a radial distance (f), said integrally formed portions forming together with the shaped rim an engagement gap, wherein both of the integrally formed portions have sloping surfaces that are inclined toward the shaped rim and downward relative to one another, wherein a notch, as opposite surface to the integrally formed portions, is located in the shaped rim opposite to the sloping surface of the integrally formed portion and wherein the integrally formed portions are designed such that they can be pressed as notching tools into a profile surface surrounding an aperture, and wherein the annular shaped rim extends at least over a width (b) of the element.

23. A nut element for fixing in an interior space of a profile, the nut element for connecting a first workpiece having the interior space to another workpiece by means of a screw or other threaded member, the shank of which passes through an opening of the workpiece and can be inserted into a recess of the nut element, which is adapted to be located in the interior space of the workpiece and is made of a metallic material, characterized in that the nut element is designed as a body which is extended in a rectangular manner and through which a tapped hole passes approximately centrally in the longitudinal axis (Q), said tapped hole opening at a surface of the element into an annular shaped rim which projects above said surface and to which two integrally formed portions rising from the surface are assigned at a radial distance (f), said integrally formed portions forming together with the shaped rim an engagement gap, wherein both of the integrally formed portions have sloping surfaces that are inclined toward the shaped rim and downward relative to one another, wherein a notch, as opposite surface to the integrally formed portions, is located in the shaped rim opposite to the sloping surface of the integrally formed portion and wherein the integrally formed portions are designed such that they can be pressed as notching tools into a profile surface surrounding an aperture, and wherein the annular shaped rim extends at least over a width (b) of the element, wherein an outside diameter (d) of the shaped rim is slightly larger than the width (b) of the element, and the shaped rim projects beyond the lateral longitudinal edges of the element.

24. A nut element for fixing in an interior space of a profile, the nut element for connecting a first workpiece having the interior space to another workpiece by means of a screw or other threaded member, the shank of which passes through an opening of the workpiece and can be inserted into a recess of the nut element, which is adapted to be located in the interior space of the workpiece and is made of a metallic material, characterized in that the nut element is designed as a body which is extended in a rectangular manner and through which a tapped hole passes approximately centrally in the longitudinal axis (Q), said tapped hole opening at a surface of the element into an annular shaped rim which projects above said surface and to which two integrally formed portions rising from the surface are assigned at a radial distance (f), said integrally formed portions forming together with the shaped rim an engagement gap, wherein both of the integrally formed portions have sloping surfaces that are inclined toward the shaped rim and downward relative to one another, wherein a notch, as opposite surface to the integrally formed portions, is located in the shaped rim opposite to the sloping surface of the integrally formed portion and wherein the integrally formed portions are designed such that they can be pressed as notching tools into a profile surface surrounding an aperture, and a rear side is formed in cross section in the shape of a circle segment and has two angular surfaces which are inclined with respect to transverse edges of the element and are flat.

\* \* \* \* \*

UNITED STATES PATENT AND TRADEMARK OFFICE
CERTIFICATE OF CORRECTION

| | | |
|---|---|---|
| PATENT NO. | : 8,142,123 B2 | Page 1 of 1 |
| APPLICATION NO. | : 11/993461 | |
| DATED | : March 27, 2012 | |
| INVENTOR(S) | : Winfried K. W. Holscher | |

It is certified that error appears in the above-identified patent and that said Letters Patent is hereby corrected as shown below:

Claim 1, Column 4, line 54, change "nut-like" to --nut--.

Claim 1, Column 4, line 58, after "the" insert --nut--.

Claim 1, Column 4, line 63, change "its" to --the--.

Claim 1, Column 4, line 64, after "face" insert --of the nut element--.

Claim 1, Column 4, line 66, change "the" to --a--.

Claim 1, Column 4, line 67, change "at" to --with--.

Claim 4, Column 5, line 13, after "(b) of the" insert --nut--.

Claim 13, Column 5, line 45, after "transverse edges of the" insert --nut--.

Claim 14, Column 5, line 48, after "of the" insert --nut--.

Signed and Sealed this
Twenty-sixth Day of June, 2012

David J. Kappos
*Director of the United States Patent and Trademark Office*